United States Patent [19]

Payne

[11] Patent Number: 5,415,506
[45] Date of Patent: May 16, 1995

[54] INTEGRALLY FORMED TRUCK BED BULKHEAD CHANNELS

[75] Inventor: Phillip E. Payne, Northville, Mich.

[73] Assignee: Chrysler Corporation, Highland Park, Mich.

[21] Appl. No.: 180,785

[22] Filed: Jan. 10, 1994

Related U.S. Application Data

[63] Continuation of Ser. No. 839,420, Feb. 21, 1992, abandoned.

[51] Int. Cl.6 .............................................. B60P 7/14
[52] U.S. Cl. .................................... 410/129; 410/121; 296/39.2
[58] Field of Search .................. 410/89, 129, 140-145, 410/151, 152, 121; 296/37.6, 39.2

[56] References Cited

U.S. PATENT DOCUMENTS

| | | | |
|---|---|---|---|
| 2,697,631 | 12/1954 | Miller | 410/140 |
| 4,170,946 | 10/1979 | Youness | 105/493 |
| 4,215,898 | 8/1980 | Ulics | 296/183 |
| 4,278,376 | 7/1981 | Hunter | 410/130 |
| 4,394,100 | 7/1983 | Sperlich | 410/156 X |
| 4,507,033 | 3/1985 | Boyd | 410/104 |
| 4,733,899 | 3/1988 | Keys | 296/24 |
| 4,767,149 | 8/1988 | Rye | 296/39 R |
| 4,772,165 | 9/1988 | Bartkus | 410/145 X |
| 4,875,730 | 10/1989 | Justice | 296/37.5 |
| 4,887,947 | 12/1989 | Bott | 410/144 |
| 4,958,876 | 9/1990 | Diaco et al. | 296/39.2 |
| 4,961,677 | 10/1990 | Downard, Jr. | 410/129 |
| 5,044,682 | 9/1991 | Wayne | 410/129 X |
| 5,044,848 | 9/1991 | Burnham | 410/129 X |
| 5,090,763 | 2/1992 | Kremer et al. | 296/39.2 X |

FOREIGN PATENT DOCUMENTS 9117066 11/1991 WIPO ................. 296/39.2

*Primary Examiner*—Michael S. Huppert
*Assistant Examiner*—Stephen Gordon
*Attorney, Agent, or Firm*—Mark P. Calcaterra

[57] ABSTRACT

Provided is a combination for partitioning a pick-up truck bed defined by a front wall, a rear tailgate, first and second laterally spaced side walls, first and second wheel house inners, and a floor into smaller compartments. The bed includes a first plurality of vertically disposed channels integrally formed in the first side wall, a second plurality of vertically disposed channels integrally formed in the second side wall and at least one bulkhead member. The bed further includes a vertical channel disposed in both the first and second wheel house inners. The bulkhead members are adapted to be slidably inserted into a pair of corresponding opposing coplanar channels. The vertically disposed channels extend a substantial portion of the vertical length of the first and second side walls.

5 Claims, 1 Drawing Sheet

5,415,506

INTEGRALLY FORMED TRUCK BED BULKHEAD CHANNELS

This is a continuation of U.S. patent application Ser. No. 07/839,420, filed Feb. 21, 1992, and now abandoned.

BACKGROUND OF THE INVENTION

This invention generally relates to partitioning the bed of a pick-up truck into several compartments. More particularly, this invention is drawn to the combination of a bulkhead member and a truck bed wherein the truck bed includes integrally formed channels adapted to readily accept bulkhead members for partitioning.

Often it is desired to restrain articles to be transferred in the bed of a pick-up truck. If the articles to be transferred are not sufficiently secured, the articles themselves are often subject to damage, or the bed of the pick-up truck is scratched or dented as a result of the shifting of the articles. A simple way to provide a restraint is to partition the bed of the pick-up truck into smaller compartments. Partitioning of the bed also results in fewer misdeliveries, where multiple articles are destined for various locations. Numerous techniques for partitioning a truck bed into multiple compartments have been disclosed in the prior art.

Vertical bulkhead members used to partition and restrain articles in truck beds typically comprise rigid walls which are secured in place with the use of fasteners on the truck bed. Illustrative of such devices are U.S. Pat. Nos. 4,278,376 and 4,507,033. Another common technique is to provide a truck bed liner which is adapted to securely receive a bulkhead member. This is illustrated by U.S. Pat. Nos. 4,875,730 and 4,958,876.

The above-discussed devices, however, have their disadvantages. Some of the devices include fasteners such as pins, bolts, hinges, or springs which require the use of tools for installation, removal, or modification. The use of tools proves to be inconvenient and time consuming. Some of the devices do not provide adequate flexibility to sufficiently adapt to cargo loads of varying physical dimensions. Some of the devices, particularly those using truck bed liners, require expensive parts which have proven to be cost prohibitive to many consumers. Most of the devices require adaptation or modification of the truck bed which unnecessarily encroaches on the full capacity of the bed.

In accordance with the teachings of the present invention, there is provided a combination of a truck bed and a bulkhead member for convenient restraint of articles to be transferred in a bed of a truck. The truck bed of the present invention is a typical truck bed, insofar as it is defined by a front wall, first and second laterally spaced side walls, a rear tailgate and a floor. At least one pair of vertically disposed channels are integrally formed in the opposing side wall of the bed. The bulkhead member of the present invention slidably engages the channels to separate the bed.

BRIEF DESCRIPTION OF THE DRAWINGS

The various advantages of the present invention will become apparent to those skilled in the art after reading the following specification and by reference to the drawings in which.

DESCRIPTION OF THE PREFERRED EMBODIMENT

Figure 1:
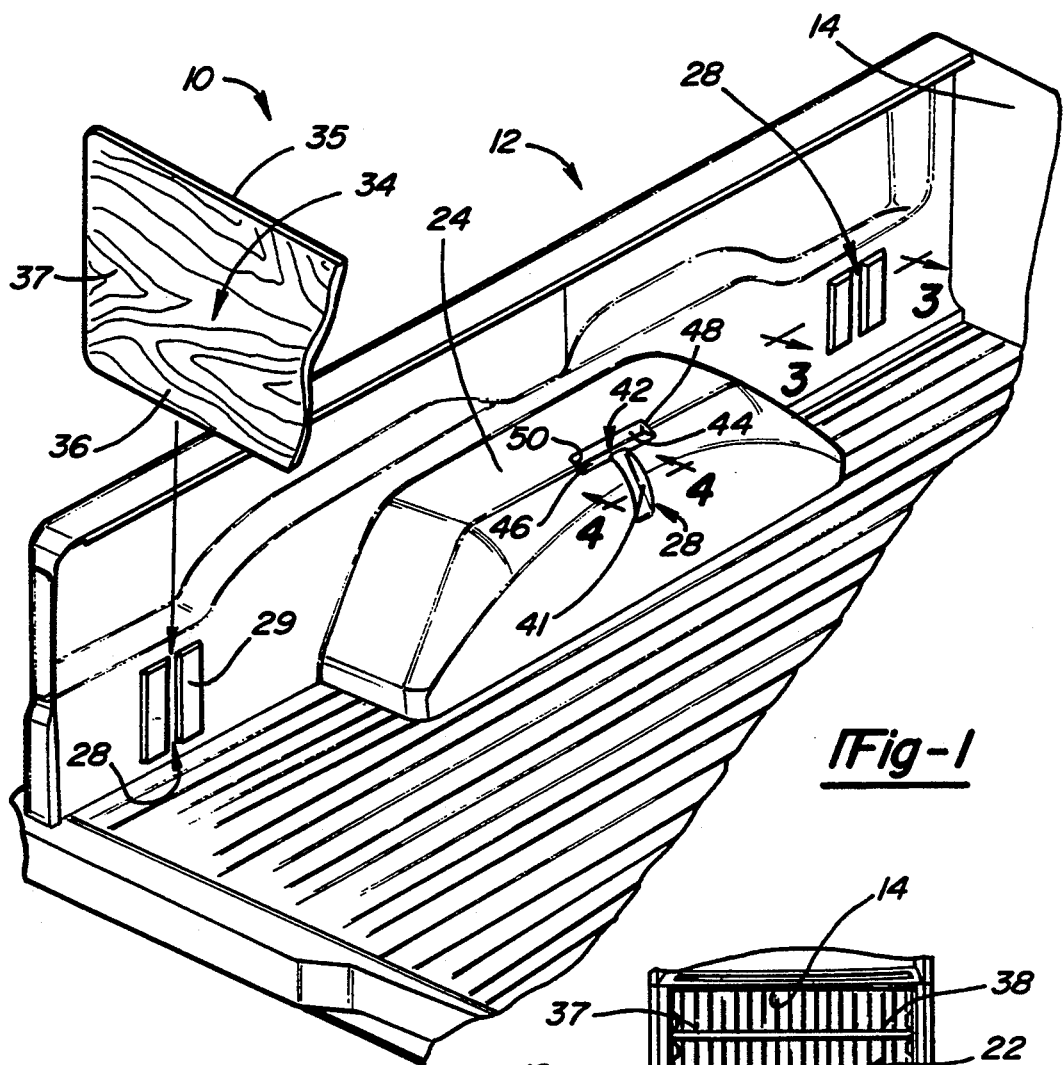
FIG. 1 is a partial perspective view of a pick-up truck bed in accordance with the present invention.
Figure 2:
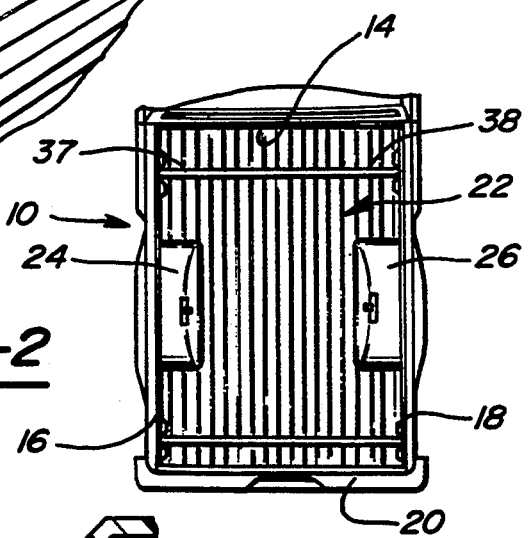
FIG. 2 is a top plan view of a pick-up truck bed in accordance with the present invention.

With reference to the drawings, FIG. 1 illustrates a partial perspective view of a pick-up truck bed 10 with a bulkhead divider system designated with the reference numeral 12. FIG. 2 is a top view of the entire bed 10.

The pick-up truck bed 10 includes, a front wall 14, first and second laterally spaced side walls 16, 18, a rear tailgate 20 and a floor 22. First and second wheel house inners 24, 26 extend from the floor 22.

The bed 10 is provided with vertically disposed channels in the first and second side walls 16, 18 and in the wheel house inners 24, 26. The vertically disposed channels are cumulatively designated with reference numeral 28. The channels 28 provided in the first and second side walls 16, 18 are each defined by a pair of vertically disposed ribs 29. The ribs 29 are parallel to one another and spaced apart a predetermined distance. In the preferred embodiment, the ribs 29 are formed integrally with the bed 10 in a single stamping operation.

In the preferred embodiment, a first plurality of vertically disposed channels 28 is formed in the first side wall 16 and a second plurality of vertically disposed channels 28, corresponding in number to and opposing the first plurality, is formed in the second side wall 18. Opposing channels 28 serve to define a vertically extending plane for receiving a bulkhead member 34. The plurality of channels 28 in both the first and second side walls 16, 18, provides sufficient flexibility to compartmentalize the bed 10 with a bulkhead member 34 into various sizes, as required by particular cargo loads. The channels 28 which are each defined by a pair of ribs 29 which traverse a substantial portion of opposing side walls 16, 18.

Each channel of the plurality of channels 28 in the first side wall 16 is aligned such that it is positioned coplanar with a corresponding channel in the second side wall 18. This coplanar alignment of corresponding opposing channels 28 allows the bulkhead member 34 to be securely positioned perpendicular to the first and second side walls 16, 18 in the manner depicted in FIGS. 1 and 2.

Further in the preferred embodiment, the first and second wheel house inners 24, 26 each are integrally provided with opposing vertical channels 28. As seen in FIG. 1, the channels 28 of the wheel house inners 24, 26 are a portion of the recesses formed in the wheel house inners 24, 26 which are generally T-shaped, having a vertical component 41 and a horizontal component 42.

Generally, the bed includes at least three pairs of channels 28. This allows the bed 10 to be divided by any number of compartments between one and four, and into various size compartments. In this regard, it should be noted that if three pairs of channels 28 are provided it may be desired, with a particular load of cargo, to use fewer than four bulkhead members 34.

In the preferred embodiment, the bulkhead member 34 is a planar board member. The bulkhead member 34 has a top edge 35, a bottom edge 36 and first and second vertical ends 37, 38. The first and second vertical ends 37, 38 are disposed sufficiently apart so as to provide stability when the first and second ends 37, 38 are inserted into opposing pairs of channels 28. Preferably, the bulkhead member 34 is made of inexpensive materials such as wood or plastic. For example, in the preferred embodiment, the predetermined distance which the pairs of ribs 29 are disposed apart is such that the defined channels 28 readily receive a panel, such as a plywood panel having a nominal ¾" thickness and a 4' width. If necessary, the first end 37 and second end 38 of each bulkhead 34 can be covered with a protective material such as plastic in order to protect the finish of the truck bed 10 and to further enhance sliding in the channel.

In use, the bulkhead member 34 is slidably inserted into opposing, coplanar, vertically disposed channels 28, in the first and second side walls 16, 18 or in the first and second wheel house inners 24, 26, such as is shown in FIG. 1. When the bulkhead member 34 is fully inserted, the bottom edge 36 of the bulkhead member 34 is substantially parallel to the floor 22 of the bed 10. Should the bed 10 be required to be partitioned into further compartments to accommodate particular cargo loads, additional bulkhead members 34 can similarly be incorporated into the bed 10.

One such illustrative cargo load in which the present invention assists in transporting, would be sacks of groceries (not shown). The channels 28 disposed nearest the front wall 14 in both the first side wall 16 and second side wall 18 are preferably placed in such a position within the bed 10 as to support the grocery bags and prevent them from tipping and spilling their contents about the bed 10.

Figure 3:
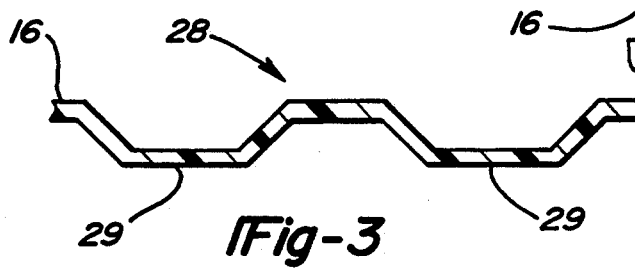
FIG. 3 is a sectional view of a side wall channel of the present invention of FIG. 1 taken along lines 3—3 thereof.

Referring to FIG. 3, illustrated is a cross-sectional view of a channel 28 disposed in one of the sidewalls 16, 18. As shown, the channel 28 is defined by a pair of vertically disposed ribs 29.

Figure 4:
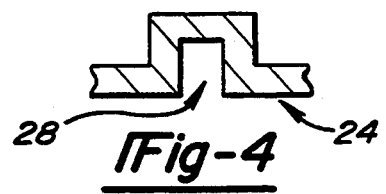
FIG. 4 is a sectional view taken along the lines 4—4 of FIG. 1.

Turning next to FIG. 4, illustrated is an alternative embodiment of the channels 28 of the present invention shown in cross section through line 4—4 of FIG. 1. In this embodiment, the channels 28 are integrally formed into the first and second wheel house inners 24, 26 such that they are recessed.

The horizontal component 42 of the recesses formed in the wheel house inners 24, 26 include an end surface 44, a bottom surface 46 and opposing side surfaces 48, 50. The horizontal component 42 is disposed to receivably support an elongated member (not shown), such as a 2×6 piece of lumber.

The present invention provides means to secure and restrain cargo in a pick-up truck bed 10. Additionally, the present invention provides a simple combination capable of being readily adapted to accommodate a particular sized cargo.

Although the invention has been described in detail with reference to a certain preferred embodiment and a specific example, variations and modifications exist within the scope and spirit of the invention as described and defined in the claims. For example, it is envisioned that the channels 28 could be integrally formed to span the entire vertical length of the pick-up bed 10.

While the above description constitutes the preferred embodiment of the invention, it will be appreciated that the invention is susceptible to modification, variation, and change without departing from the scope and fair meaning of the accompanying claims.

What is claimed is:

1. A pick-up truck of the type having a bed including a cargo area defined by a front wall, first and second laterally spaced sidewalls each having a vertical length, a rear tailgate and a floor, the pick-up truck comprising:

first and second vertically disposed channels adapted to receive a substantially planar member for horizontally compartmentalizing the cargo area, the first and second vertically disposed channels each being defined by first and second raised portions unitarily stamped into the first and second sidewalls of the bed during manufacturing of the bed, each of said raised portions having a planar, generally rectangular surface substantially parallel to at least one of the first and second laterally spaced sidewalls, said generally rectangular surface interconnected to the bed by a ramped top portion and a ramped side portion, said ramped side portion forming an angle of approximately 45° with its respective sidewall; and a bulkhead member having a first vertical end adapted to slidably engage said first vertically disposed channel and a second vertical end adapted to slidably engage said second vertically disposed channel to thereby horizontally divide the bed into a plurality of compartments.

2. The pick-up truck of claim 1 wherein said first and second vertically disposed channels each include a longitudinal axis, wherein said longitudinal axes are substantially coplanar.

3. The pick-up truck of claim 1 wherein said first and second vertically disposed channels extend a substantial portion of said vertical length of said first and second laterally spaced sidewalls, respectively.

4. The pick-up truck of claim 3 wherein each of said raised portions are spaced apart from said floor of said bed.

5. A pickup truck of the type having a bed including a cargo area defined by first and second wheel house inners each including a generally smooth outer surface having a top surface and a side surface, a front wall, first and second laterally spaced apart sidewalls, a rear tailgate and a floor, the pick-up truck comprising:

first and second vertically disposed channels integrally stamped into the first and second laterally spaced sidewalls, respectively, during manufacturing of the pick-up truck, the first and second vertically disposed channels each being defined by first and second raised portions, each of said raised portions being unitarily stamped into the pick-up truck and having a substantially planar portion disposed substantially parallel to at least one of the first and second laterally spaced apart sidewalls, each of said raised portions being interconnected to the bed by a ramped top surface and at least one ramped side surface, said at least one ramped side surface forming an angle of approximately 45° with its respective sidewall;

a second set of first and second vertically disposed channels stamped into the first and second wheel house inners, respectively, during manufacturing of the pick-up truck;

first and second horizontally disposed channels stamped into the first and second wheel house inners of the pick-up truck, respectively, during manufacturing of the pick-up truck, each of said first and second horizontally disposed channels having a rear edge substantially parallel to at least one of the laterally spaced sidewalls and substantially normal to first and second end edges, said second set of first and second vertically disposed channels intersecting said first and second horizontally disposed channels, respectively, so as to form a T-shaped recess in both of said first and second wheel house inners of the pick-up truck;

a bulkhead member having a first vertical end adapted to slidably engage said first vertically disposed channel integrally stamped into said first laterally spaced sidewall and a second vertical end adapted to slidably engage said second vertically disposed channel integrally stamped into said second laterally spaced sidewall to thereby divide the bed into a plurality of compartments.

* * * * *